United States Patent [19]
Ochiai

[11] Patent Number: 5,703,667
[45] Date of Patent: Dec. 30, 1997

[54] LIGHT GUIDE PLATES AND LIGHT GUIDE PLATE ASSEMBLY UTILIZING DIFFRACTION GRATING

[75] Inventor: Shin-Ichiro Ochiai, Yao, Japan

[73] Assignee: Shimada Precision, Co., Ltd., Kyoto, Japan

[21] Appl. No.: 694,064

[22] Filed: Aug. 8, 1996

[30] Foreign Application Priority Data

May 31, 1996 [JP] Japan .................................. 8-138204

[51] Int. Cl.$^6$ ...................... G02F 1/1335; F21V 7/04
[52] U.S. Cl. ............................................ 349/65; 362/31
[58] Field of Search ........................ 349/62, 65, 112; 362/26, 27, 28, 29, 30, 31, 32; 385/10

[56] References Cited

U.S. PATENT DOCUMENTS

| | | | |
|---|---|---|---|
| 4,798,448 | 1/1989 | Raalte | 349/62 |
| 5,353,133 | 10/1994 | Bernkopf | 362/32 |
| 5,418,631 | 5/1995 | Tedesco | 349/65 |
| 5,451,980 | 9/1995 | Simon et al. | 349/62 |
| 5,566,007 | 10/1996 | Ikeda et al. | 349/114 |
| 5,594,830 | 1/1997 | Winston et al. | 385/146 |

FOREIGN PATENT DOCUMENTS

| | | |
|---|---|---|
| 5-127157 | 5/1993 | Japan . |
| 5-55103 | 7/1993 | Japan . |

*Primary Examiner*—William L. Sikes
*Assistant Examiner*—Tcep H. Nguyen
*Attorney, Agent, or Firm*—Nixon & Vanderhye P.C.

[57] ABSTRACT

A light guide plate is provided which utilizes the phenomenon of diffraction based on wave optics of light, and which can provide much higher and more uniform brightness over an entire illuminated surface than the brightness level achievable by the prior art and can assure longer battery life through reduced power consumption for a light source. The light guide plate consists of a transparent plate, at least on one end of which light rays from the light source fall. The light guide plate has a diffraction grating printed or worked on a bottom surface thereof such that at least one of a grating part width/non-grating part width ratio in unit-width or a sectional configuration of the diffraction grating is varied so as to enhance and uniform light intensity on a top surface of the light guide plate.

4 Claims, 6 Drawing Sheets

LIGHT GUIDE PLATES AND LIGHT GUIDE PLATE ASSEMBLY UTILIZING DIFFRACTION GRATING

BACKGROUND OF THE INVENTION

1. Field of the Invention

The present invention relates to a light guide plate for use as a backlight plate in a liquid crystal display device or an emission guiding plate.

2. Description of the Prior Art

Hitherto, planar surface illuminators designed for use in a liquid crystal display device for backlighting purposes have been known which are of the type as shown by way of example in FIGS. 6A–6C (for which reference is made to Japanese Patent Application Laid-Open Publication No. HEI 5-127157). The planar surface illuminator 31, as shown in FIG. 6A, comprises a light guide plate 32 formed of a transparent acrylic resin material which has a flat top surface 32a and a bottom surface 32b with a large number of multi-faceted prisms 33, a light source 34, for example a cold cathode fluorescent lamp, arranged along one end side 32c of the light guide plate 32, a reflector plate 35 disposed generally parallel to the bottom surface 32b of the light guide plate 32, and an unillustrated liquid crystal display panel disposed in spaced parallel relation to the top surface 32a of the light guide plate 32.

Each of the multi-faceted prisms 33, as shown in detail bottom view of FIG. 6B, defines a triangular pyramid having a regular triangle base and circumscribed by three lateral faces α, β, γ rectangular to each other, the triangular pyramid projecting downward from the underside 32b of the light guide plate so that it functions as a corner cube to cause incident light to be totally reflected as shown by arrows. One side of the regular triangle is 0.16 mm in length, for example, if the light guide plate 32 is dimensioned to be 18 mm×9.6 mm×0.5 mm.

When the liquid crystal display is viewed in good light without the use of light source 34, any light incident from the top surface 32a onto the light guide plate 32 via the liquid crystal display panel is reflected by a multi-faceted prism 33 at the underside and then emerges again from the top surface 32a to illuminate the liquid crystal display panel from below, as shown by arrows in FIG. 6C. This affords easy viewing of display.

When the liquid crystal display is viewed in poor light with the light source 34 turned on, as may be appreciated from arrows in FIG. 6A, light rays incident from the light source 34 toward the top surface 32a of the light guide plate 32 are totally reflected from the top surface 32a, and light rays incident toward the underside 32b are totally reflected by multi-faceted prisms 33, being then partially reflected by the top surface 32a. Light rays incident toward the reflector plate 35 are caused to enter the light guide plate 32 after they are reflected by the reflector plate 35. Thus, most light rays from the light source 34 are conducted a long distance within the light guide plate 32 while undergoing the process of total reflection. Therefore, the liquid crystal display panel can be illuminated brightly from below, with less irregularity of light intensity.

However, the known planar surface illuminator 31 has drawbacks as pointed out below. Although the illuminator 31 has a large number of multi-faceted prisms 33 on the bottom surface 32b of the light guide plate 32, one side of each prism is 0.16 mm long, for example, or considerably larger as compared with the wavelength of light, and in addition individual prisms effect total reflection separately and not in conjunction with one another. Therefore, one problem is that if an attempt is made to enhance the brightness of the light guide plate 32 as a whole, irregular reflection does occur at a spot defining a valley between adjacent prisms, with the result that the quantity of light directed toward the top surface 32a is reduced so that an extreme brightness/darkness contrast occurs on the top surface 32a as illuminated.

Another problem is that if the planar surface illuminator 31 is to be employed in a battery-powered liquid crystal display unit, it is necessary to illuminate the light source 34 by supplying large current in order to compensate for any loss in the quantity of light conducted to the to-be-illuminated surface 32a, thereby to provide a high degree of light intensity, which will result in shortening battery's life and will not permit long use of the battery.

SUMMARY OF THE INVENTION

Therefore, it is an object of the present invention to provide a light guide plate which utilizes, instead of total reflection by means of prisms using geometrical optics as in the prior art, the phenomenon of diffraction based on wave optics of light that has hitherto been not utilized in light guide plates due to the problem of minute finish for diffraction grating, and spectral problems associated with the use of a white-light source, and which can provide much higher and more uniform brightness over the entire illuminated surface than the brightness level achievable by the prior art and can assure longer battery life through reduced power consumption for the source of light.

In order to achieve the aforementioned object, there is provided a light guide plate comprising:

a transparent plate; and a diffraction grating provided on a bottom surface of the plate and diffracting toward a top surface of the plate light incident from a light source to at least one end of the plate;

wherein at least one of a grating part width/non-grating part width ratio in unit-width or a sectional configuration of the diffraction grating is varied so as to enhance and uniform light intensity on the top surface of the light guide plate.

As FIG. 1 illustrates, in case that a light guide plate 2 has a diffraction grating 3 (ruled grooves) formed on the back 2b of the plate 2, with adjacent grooves spaced a distance d, for example, light rays I incident from one end side 2c of the light guide plate 2 toward the back 2b are diffracted by the diffraction grating 3 toward the surface 2a as shown by arrows. In this case, the following equation (1) holds between the incident light I and diffracted light D:

$$(\sin i - \sin \theta) = \pm m (\lambda/d) \tag{1}$$

where, i denotes angle of incidence, θ denotes diffraction angle, λ denotes wavelength of light, and m denotes an integer.

In FIG. 1, $D_1$, $D_2$, $D_3$ indicate, respectively, directions of diffracted light where m in the above equation is 1, 2 and 3. First-order diffracted light $D_1$ undergoes total reflection at surface 2a and is conducted far away within the light guide plate 2, because its angle of incidence onto the surface 2a is larger than critical angle φ (in the case of an acrylic resin-made light guide plate, for example, φ=42°). Second-order and third-order diffracted light rays $D_2$, $D_3$ go outward from the surface 2a because their respective angles of incidence onto the surface 2a are smaller than critical angle φ. Therefore, by adjusting the angle of incidence i on the back 2b and by properly determining a grating constant d relative to the wavelength λ of the light source so as to allow diffracted light rays of low order (e. g., m=1) to go away from the surface 2a in a direction generally orthogonal to the surface and so as to cause diffracted light rays to be conducted far away within the light guide plate, so that the surface 2a of the light guide plate 2 is illuminated very brightly by outgoing light rays of high intensity orthogonal to the surface and internal light rays of total reflection conducted within the light guide plate. In this conjunction, dimensional adjustments may be effected so that the direction of diffraction practically orthogonal to the surface 2a will coincide with the direction of the total internal reflection of incident light due to the angle of inclination of ruled grooves in the sectional profile thereof. In other words, ruled grooves of the diffraction grating are made to have a blazing angle to provide a most bright illuminated surface 2a.

The diffraction grating concept of the present invention is essentially different from the prior art concept of multifaceted prism 33 (see FIGS. 6A–6C) in which individual prisms separately act to totally reflect light rays, in that grating constant d or groove interval is of the order of from submicron to tens of microns (0.1 to 10 μm), or of the order of 1/100 as compared with that of conventional prisms having a side dimensioned to be 0.16 mm, and in that adjacent planar surfaces between each numerous minutely ruled grooves synergistically cooperate to cause light having wave characteristic to be exceedingly strongly diffracted. Thus, according to the present invention, it is possible to provide an illuminated surface 2a having an exceedingly high brightness. A light guide plate having such diffraction grating may be fabricated, for example, by molding through the use of a die having ruled grooves internally formed by machining or a mold lined with an electroformed hologram film of diffraction grating, or by creating ruled grooves directly on the back of a light guide plate by machining or printing, or by bonding to the back a film having such grooves printed or holographically formed thereon.

In a first embodiment of the present invention, a light guide plate 2 has a feature such that at least one of the grating part width/non-grating part width ratio in unit-width or the sectional configuration of the diffraction grating is varied so as to enhance and uniform light intensity on the surface 2a of the light guide plate. More specifically, the diffraction grating of the light guide plate 2 presents a varying sectional configuration, for example, from sine wave to sawtooth, or gradual increase in the grating part width/non-grating part width ratio in unit-width, in a direction away from one end face 2c on the light source side of the light guide plate 2, that is, in proportion as the quantity of light transmitted from the light source decreases. Therefore, light rays from the light source undergo weak diffraction at spots nearer to the one end face 2c at which light energy is available in a larger quantity and strong diffraction at more remote spots at which light energy is available in a smaller quantity. As a result, the surface 2a of the light guide plate is illuminated with light of a very uniform intensity.

In a second embodiment of the invention, the light guide plate includes a diffusion plate provided on the top surface side thereof for turning any spectrally diffracted light back into white light through irregular reflection.

If the light source is white light that includes light components of various wavelengths λ (see FIG. 3), as may be apparent from the above noted equation (1), diffracted light goes out as spectra as indicated by arrows R, G, B in FIG. 2. The outgoing spectra are allowed to pass through the diffusion plate disposed on the surface side, whereby the spectra are turned back into white light. Therefore, even when diffraction is effected using white light as the light source, the surface of the light guide plate can be illuminated not with spectra but with white light of uniform and high intensity.

In a third embodiment of the invention, a light guide plate assembly comprises a plurality of light guide plates of the first embodiment placed one upon another, the assembly being capable of exhibiting at least one of increased light intensity and improved brightness uniformity features.

For example, in case where two light guide plates are placed one upon the other, light rays from the light source, incident on the lower light guide plate, are diffracted upward by the diffraction grating on the back of the lower light guide plate for entry into the upper light guide plate in which diffracted light rays of respective orders are again diffracted. Light rays from the light source, incident on the upper light guide plate, are diffracted and go out from the surface in the same way as described with respect to the first embodiment. Therefore, the surface of the upper light guide plate provides at least one of increased intensity feature or improved intensity uniformity feature, when compared with the case in which a single light guide plate is employed.

In a fourth embodiment of the invention, the light guide plate assembly includes a diffusion plate on the top surface side thereof for turning any spectrally diffracted light back into white light through irregular reflection. Therefore, for the same reasons stated with respect to the second and third embodiments, even when diffraction is effected using white light as the light source, the surface of the light guide plate can be illuminated with not spectra but with white light of uniform and high intensity, and the assembly can exhibit at least one of increased intensity feature or improved intensity uniformity feature, as compared with the case in which a single light guide plate is employed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described in detail with reference to the illustrated embodiments.

Figure 1:
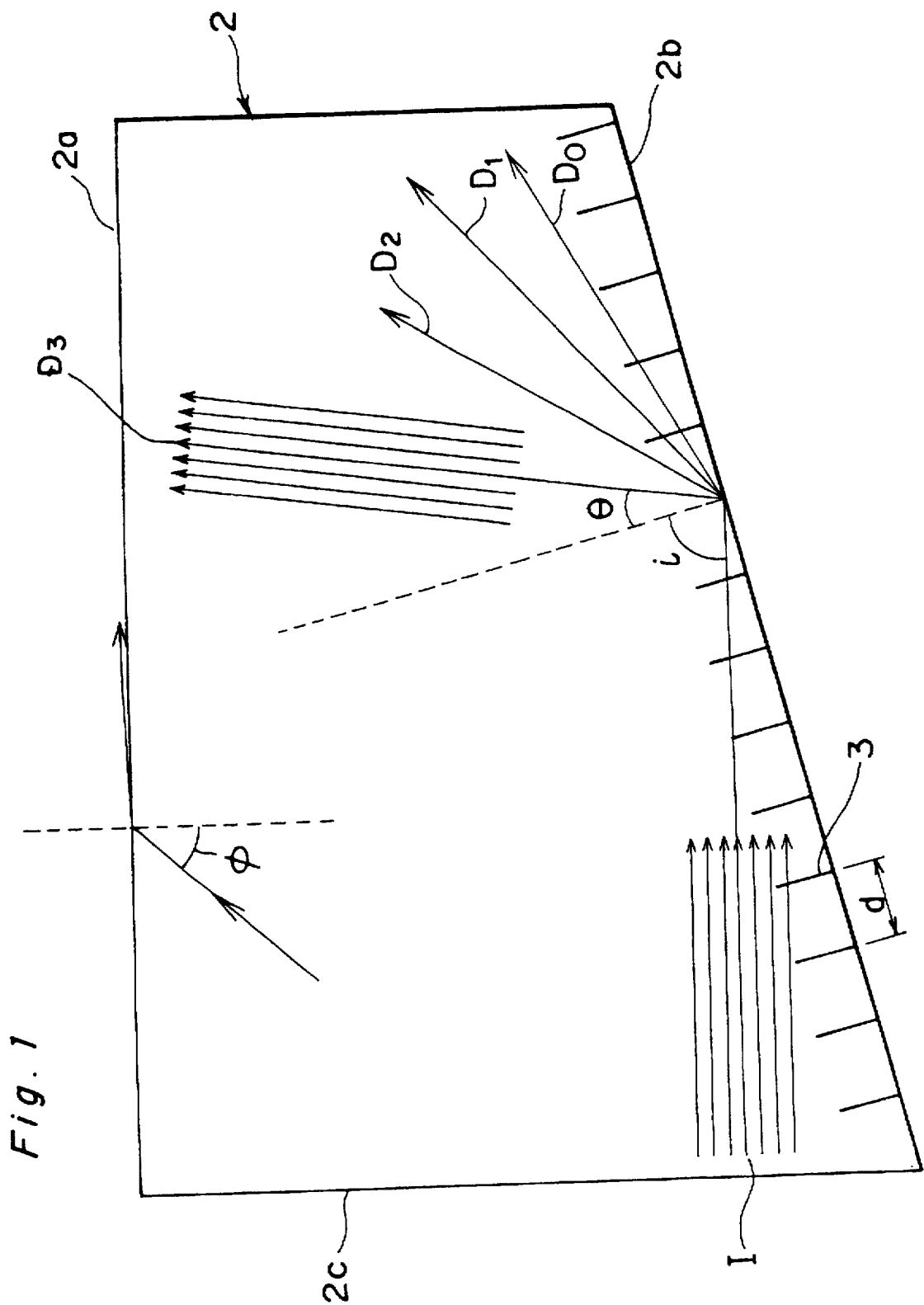
FIG. 1 is a schematic view showing theoretically the diffraction of light by a diffraction grating provided on the back of a light guide plate.
Figure 2:
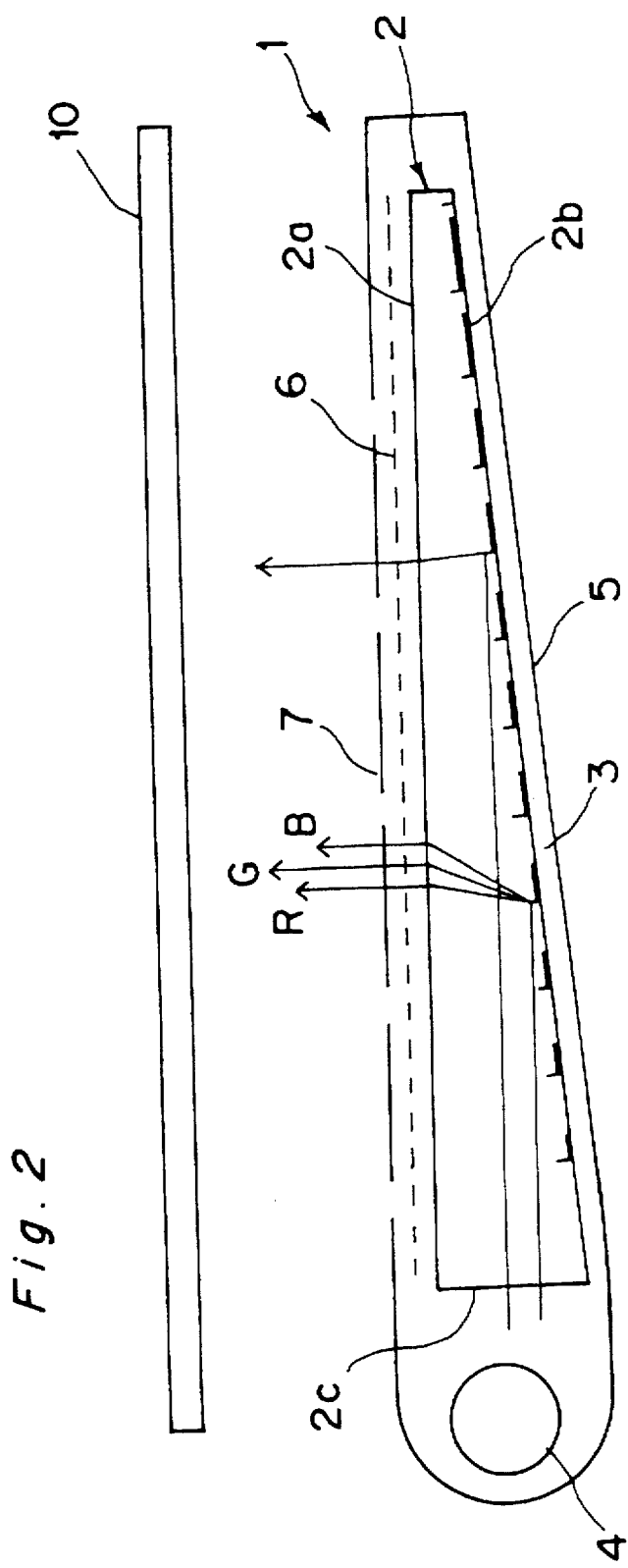
FIG. 2 is a sectional view showing an embodiment of light guide plate according to the invention as employed in a planar surface illuminator of a liquid crystal display device.

FIG. 2 shows an embodiment of a light guide plate used for backlighting in a liquid crystal display apparatus. The liquid crystal display apparatus comprise a liquid crystal display panel 10, and a planar surface illuminator 1 disposed therebelow.

The planar surface illuminator 1 comprises a light guide plate 2 formed of transparent plastic resin which has a diffraction grating 3 provided on the back 2b, a fluorescent tube 4 disposed as a light source along a thicker end side edge 2c of the light guide plate 2 and having a semihot electrode or a cold cathode, a reflector 5 for reflecting light which covers portions, other than the surface 2a, of the light guide plate 2 and the fluorescent tube 4 in a manner to enclose the same therein, a diffusion plate 6 disposed on the surface 2a side of the light guide plate 2 in parallel relation thereto, and a collector prism sheet 7 disposed on the surface side of the diffuser plate in parallel relation thereto.

The back 2b of the light guide plate 2 is inclined at an angle of 0.5° to 5° relative to the surface 2a so as to be enabled to receive on its entire surface light rays incident practically horizontally from the fluorescent tube 4, and has a diffraction grating 3 formed by molding in the form of minute ruled grooves. As already stated with reference to the diffraction equation (1), the distance d between adjacent grooves in the diffraction grating 3 is established to allow diffracted light rays of low order to go out from the surface 2a practically perpendicular thereto and in concert in a direction of total reflection.

The ratio of grating part width/non-grating part width in a unit width of the diffraction grating 3 is established so as to become progressively greater in a direction away from the end side 2c so that the quantity of diffracted light will increase in proportion as the quantity of light available from the fluorescent tube 4 decreases. The term "unit width" used herein means the sum of the width of one grating part and the width of one non-grating part, that is, the width of a unit division. In FIG. 2, 11 divisions, each having a unit width, are schematically shown as being provided on the back 2b of the light guide plate 2. The width of grating part in each respective division is represented by a heavy line, and the width of non-grating part in each respective division is represented by a thin line. As shown, the proportion of heavy line portion, or grating part width, in respective division becomes larger as the division is more remote from the end side 2c. It may be appreciated from this that the quantity of diffracted light will increase accordingly. For simplicity of explanation, the number of divisions is shown as 11, but in actuality the number is far much greater and may be of the order of 1000, for example.

In the present embodiment, a grating part and a non-grating part are provided in laterally spaced apart relation within each unit width. Alternatively, such two parts may be alternately provided, one in each unit width, so that a particular grating part width/non-grating part width ratio is obtained for the unit width. The ratio of grating part width/non-grating part width need not necessarily be increased gradually as the distance from the end side 2c becomes greater as in FIG. 2. The ratio may be freely varied as long as a surface illumination of high and uniform intensity can be obtained.

In the present embodiment, the diffraction grating 3 has a grating constant or groove to groove distance d of several microns. Such grating is molded in conjunction with the light guide plate by employing a mold having ruled grooves internally formed by machining. The diffraction grating of the invention may also be fabricated by in-mold molding in which the mold is internally fitted with a hologram film for a diffraction grating having a grating constant d of 0.1–10 μm, machining ruled grooves on the back of the light guide plate, or printing such grooves on the back of the light guide plate or bonding a hologram diffraction grating film to the back surface.

The planar surface illuminator 1 including a light guide plate of the above construction illuminates the liquid crystal display panel 10 in manner as described below.

Figure 6A:
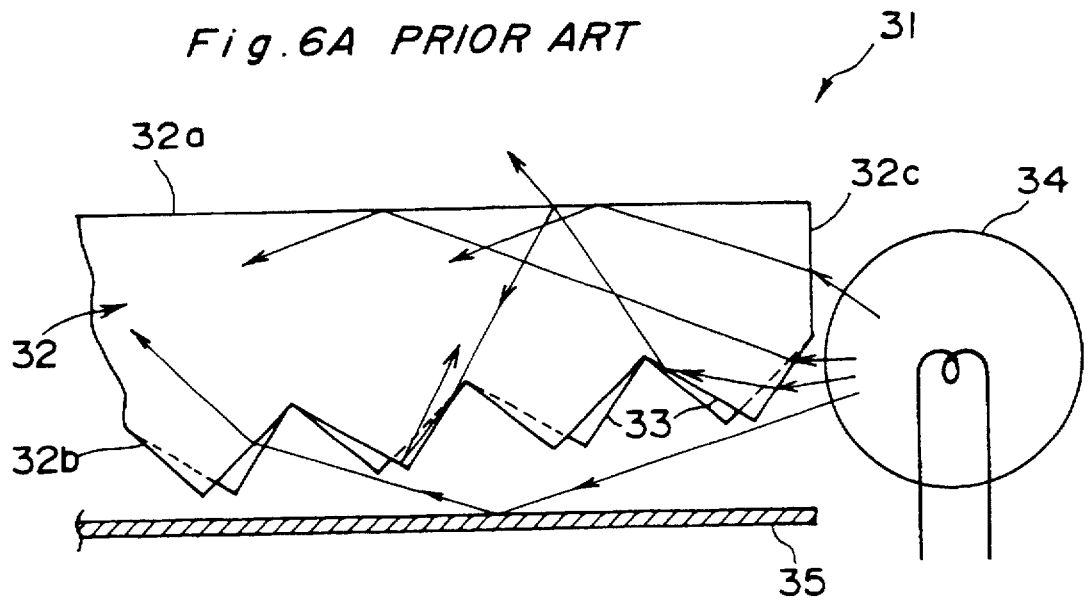
FIGS. 6A–6C are sectional views showing a prior art planar surface illuminator.
Figure 6B:
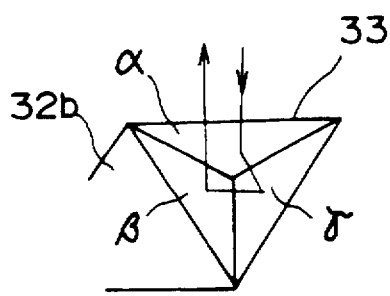
Figure 6C:
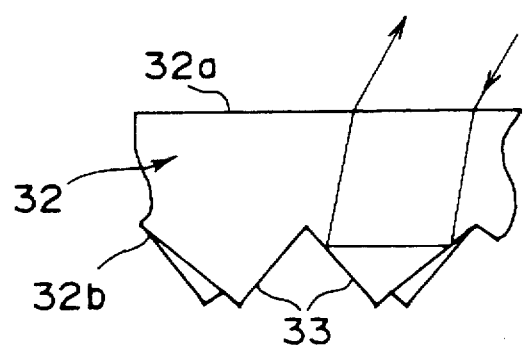

White light emitted from the fluorescent tube 4 enters the light guide plate 2 practically horizontally from the end 2c and impinges upon the entire surface of the back 2b which is inclined at an angle of 0.5°–5°, being then diffracted by the diffraction grating 3 provided over the back surface, through cooperation of adjacent smooth surfaces between each numerous ruled grooves so that high intensity diffracted light rays of low order (e.g., 1st to 3rd order) go out practically vertically from the surface 2a of the light guide plate 2 as shown by arrows. That is, the diffraction grating 3, in which numerous minutely ruled grooves of 1/100 order of conventional prisms synergistically cooperate to function as such, can provide outgoing light of far much higher intensity than conventional triangular pyramid prisms 33 (see FIGS. 6A–6C) can provide, wherein sides of the prism are dimensionally large on the order of 0.16 mm each and each prism individually effects total reflection of light simply in a photogeometrical way and without cooperation with adjacent prism. Since the ratio of grating part width/non-grating part width in unit width of diffraction grating 3, that is, diffraction efficiency of the grating (ratio of diffracted light intensity to incident light intensity), becomes greater in a direction away from the fluorescent tube 4 side end 2c, the quantity of diffracted light will increase in proportion to any decrease in light quantity which occurs in a direction away from the light source. As a result, the surface 2a of the light guide plate 2 is illuminated with light of high intensity and uniform brightness.

Figure 3:
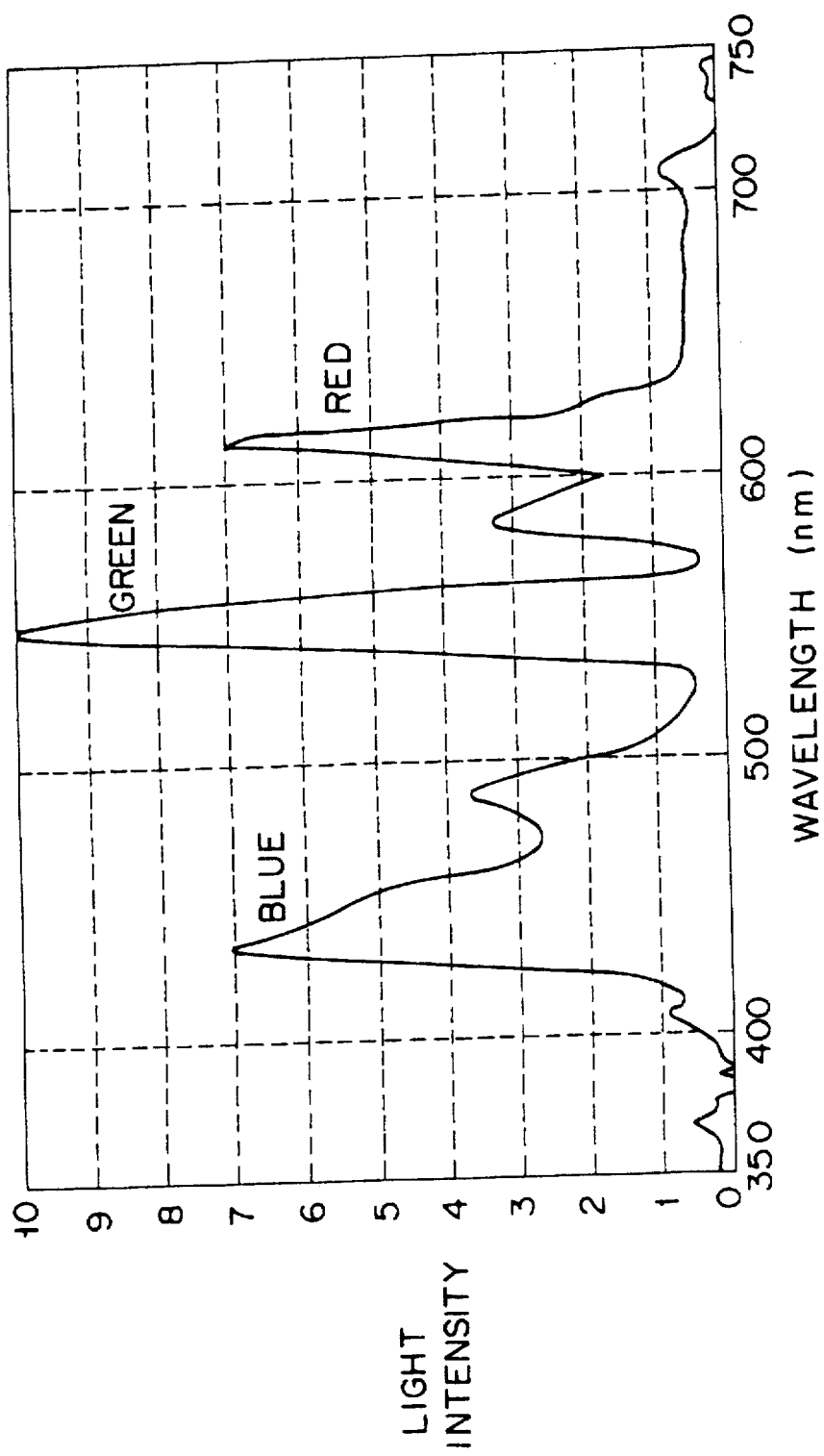
FIG. 3 is graphic view showing a spectral distribution of white light rays emitted from the light source shown in FIG. 2.

White light emitted from the fluorescent tube has a spectral distribution with peaks in blue (B), green (G), and red (R) respectively, as shown in FIG. 3. Thus, diffracted light exhibits spectra as shown by arrows R, G, B in FIG. 2 according to the earlier noted diffraction equation (1). However, as it passes through the diffusion plate 6 disposed in front of the light guide plate 2, the diffracted light turns back into white light, which in turn is collected by a prism sheet 7 disposed in front of the diffusion plate 6 before it exits the illuminator 1. As a result, the liquid crystal display panel 10 is illuminated not with spectra but with white light from below at high and uniform intensity. The diffusion plate 6 is also effective for turning back light polarized by diffraction to its original state.

Further, because of the fact that the fluorescent tube 4 and parts other than surface of the light guide plate 2 are covered with the reflector 5, almost all light rays from the fluorescent tube 4 are caused to be incident upon the light guide plate 2. This makes it possible to illuminate the liquid crystal display panel 10 with greater luminance.

A light guide plate having a diffraction grating of d=3 μm was fabricated by using a mold which is formed with a ruled pattern by micromachining. The surface luminance of the light guide plate at a position spaced 100 mm from the light source side end was compared with that of a conventional light guide plate having a printed dot pattern of about 100 μm size. As a result, it was found that the former was twice as bright as the latter.

Therefore, when the light guide plate 2 is employed in a battery powered liquid crystal display, the lifetime of the battery can be doubled because high intensity backlight can be obtained from the light source 4 with less power requirement. Further, when the light guide plate 2 is applied to a battery powered liquid crystal television, utilization of such a television outdoors in good light is possible which has hitherto been not possible from the view point of electric power consumption.

Figure 4E:
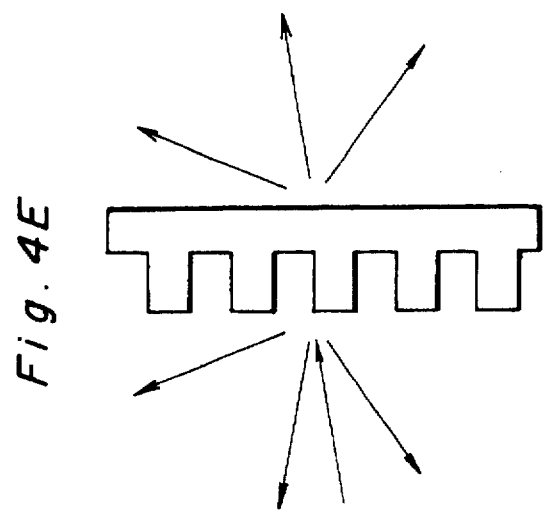
FIGS. 4A–4E are schematic views showing relations between the intensity of diffracted light and the grating constant as well as sectional configuration of diffraction grating.
Figure 4C:
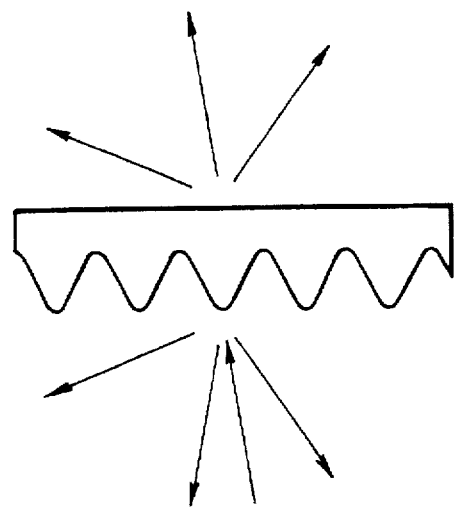
Figure 4D:
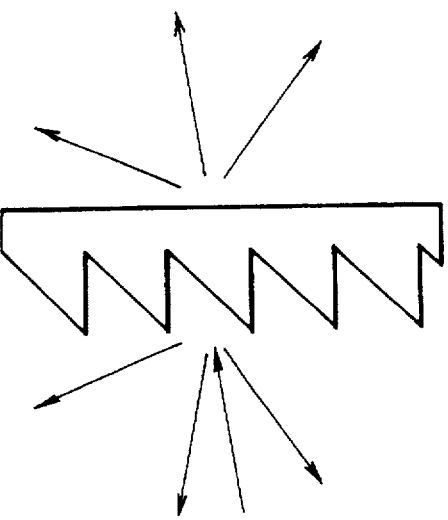
Figure 4A:
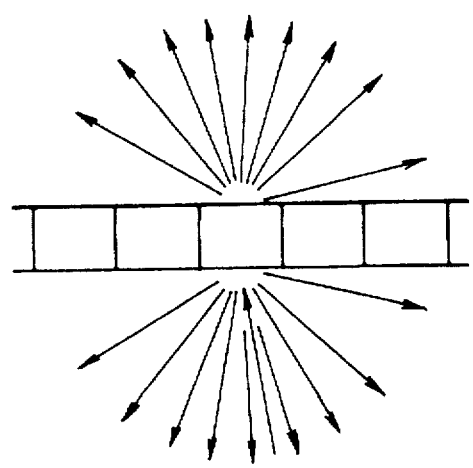
Figure 4B:
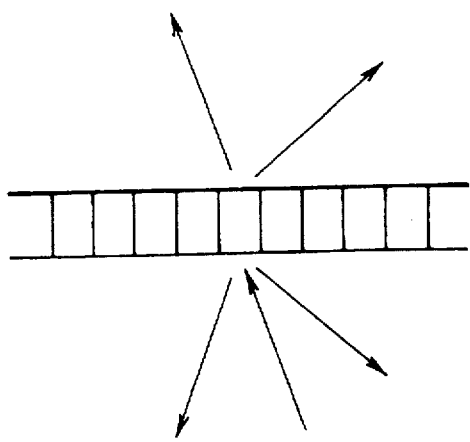

FIGS. 4A–4E schematically illustrate well known relations between luminance on the surface 2a of light guide plate 2, i. e., diffracted light intensity, and grating constant as well as sectional configuration of diffraction grating 3. It is noted, however, that in FIGS. 4A–4E, light is incident on the light guide plate in practically perpendicular relation thereto and not incident from one end of the light guide plate into the interior thereof as described above. It may be added that the schematics shown are made by T. K. Gaylord as presented at the Diffractive Optics Work Shop, held at Georgia Inst. of Tech., United States, in March 1996.

Where the grating constant is relatively large, as shown in FIG. 4A, diffraction occurs up to high order (see m in the diffraction equation (1)), but diffraction efficiency of each order is low. Where the grating constant is small, as shown in FIG. 4B, diffraction occurs only on a specified order, but diffraction efficiency is high. Next, where the grating is sinusoidal in sectional configuration as shown in FIG. 4C and as often seen with holographic diffraction gratings, diffraction efficiency is low. In the case of a grating having a sectional configuration of sawtooth as shown in FIG. 4D and as often seen with diffraction gratings formed by machining, the grating may be a blazed grating of the type as already described, in which the direction of total reflection of incident light coincides with the direction of diffracted light, and which provides high diffraction efficiency. Where the grating has a rectangular configuration as shown in FIG. 4E and is a so-called binary diffraction grating, diffraction efficiency is low.

Further, as already stated with reference to FIG. 2, any increase or decrease in the ratio of grating part width to non-grating part width in unit width of a light guide plate means an increase or decrease in the area of the diffraction grating, which results in an increase or decrease in diffraction efficiency.

In the above described embodiment, therefore, the grating part width/non-grating part width ratio in each unit width of the diffraction grating 3 is varied along the length of the light guide plate for uniforming the luminance on the surface 2a of the light guide plate. It is also possible to vary the sectional configuration of the diffraction grating in a similar manner thereby to uniform the luminance.

Figure 5:
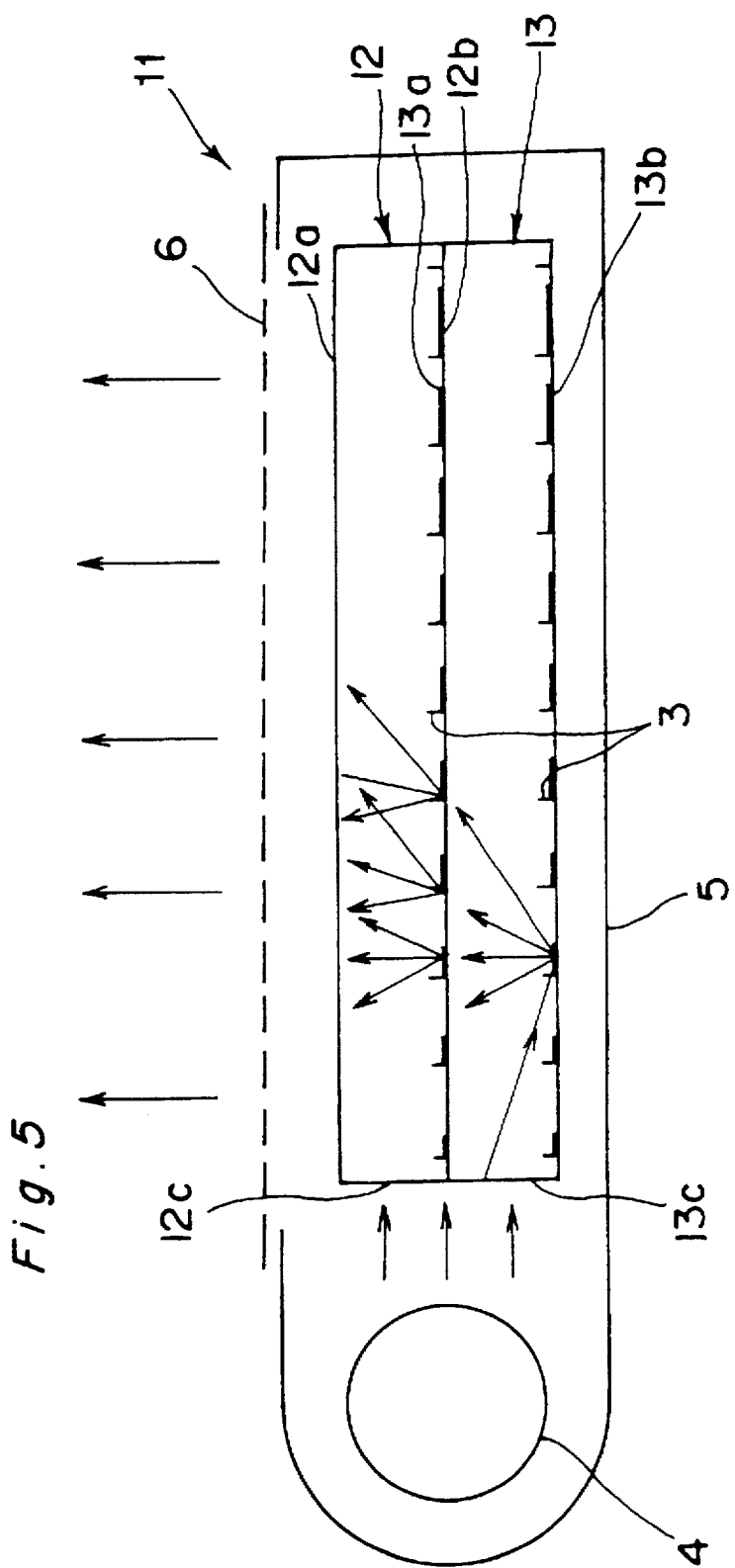
FIG. 5 is a sectional view of a planar surface illuminator including a light guide plate according to an embodiment of the invention.

FIG. 5 shows a sectional view of a planar surface illuminator 11 including a light guide plate assembly which represents another embodiment of the invention.

The planar surface illuminator 11 is different from the illuminator described with reference to FIG. 2 in that it includes two light guide plates 12, 13, each having a top and bottom surfaces in parallel, placed one upon the other, and in that the light collecting prism sheet is omitted. Parts similar to those in FIG. 2 are designated by the same reference numerals, for which explanation is omitted.

The use of light guide plates 12, 13 each having parallel top and bottom surfaces is so intended that the plates in their superposed form have a rectangular configuration in section in order to provide for good stability maintenance. The bottom surface 12b, 13b of each respective light guide plate is engraved with a diffraction grating 3 in which the ratio of grating part width/non-grating part width in unit width becomes larger in a direction away from one end 12c, 13c adjacent to the light source just as in FIG. 2.

The planar surface illuminator 11 illuminates an unillustrated liquid crystal display panel disposed on its surface side as in FIG. 2 in manner as described below.

Light from the fluorescent tube 4, incident on the lower light guide plate 13, is diffracted upward by the diffraction grating 3 on the bottom surface 13b as shown by arrows for entry into the upper light guide plate 12. Light rays practically perpendicular to the light guide plate 12 go out from the surface 12a as they are, while light rays oblique to the light guide plate 12 are diffracted by the diffraction grating 3 of the bottom surface 12b and then likewise go out from the surface 12a. Light from the fluorescent tube 4, incident on the upper light guide plate 12, is diffracted by the diffraction grating 3 of the bottom surface 12b in the same manner as described above and then goes out from the surface 12a. Related functions are similar to those described earlier, including the function of the diffraction grating 3 for uniforming luminance through varying ratios of grating part width/non-grating part width in unit width, the function of the diffusion plate 6 for turning back outgoing spectra into white light, and the reflecting function of the reflector 5.

By virtue of outgoing diffracted light through diffuser plate 6, therefore, the liquid crystal display panel is uniformly illuminated on the order of 10% luminance deviation (=(maximum luminance−minimum luminance)/mean luminance; 20% in the prior art), which luminance is 1.5 times as large as that in the case where a single light guide plate is employed. This fact has been ascertained by measurements.

In the foregoing embodiments, there are provided a reflector 5 for reflecting light rays directed toward other than the illuminated surface, and a prism sheet for collecting outgoing light from the diffusion plate. This provides an advantage that luminance on the illuminated surface can be further enhanced.

The light source, such as fluorescent tube 4, may be disposed in a way different from the foregoing embodiments, for example, one each at opposite ends of the light guide plate, in order to enhance the luminance at the illuminated surface. It is also possible to use three or more light guide plates in superposed relation. Where diffusion plate is omitted, monochrome light without spectrum may be used fox the source of light in order to obtain same effects and advantages as in the foregoing embodiments.

The light guide plate in accordance with the present invention is not only applicable to aforesaid liquid crystal display apparatus, but also may be advantageously used for emission guiding plates having a fluorescent tube at one end, with an emergency exit mark printed on the surface, which are usually found at building ceilings and the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light guide plate comprising:

a transparent plate; and a diffraction grating provided on a bottom surface of the plate and diffracting toward a top surface of the plate light incident from a light source to at least one end of the plate;

wherein a grating part width/non-grating part width ratio in a unit-width of the diffraction grating is varied so as to enhance and provide uniform light intensity on the top surface of the light guide plate.

2. A light guide plate according to claim 1, wherein the light guide plate includes a diffusion plate provided on the top surface side thereof for turning any spectrally diffracted light back into white light through irregular reflection.

3. A light guide plate assembly comprising a plurality of light guide plates of claim 1 placed one upon another, the assembly being capable of exhibiting at least one of increased light intensity and improved brightness uniformity features.

4. A light guide plate assembly according to claim 3, wherein the light guide plate assembly includes a diffusion plate on the top surface side thereof for turning any spectrally diffracted light back into white light through irregular reflection.

* * * * *